US012544794B2

(12) United States Patent
Liu et al.

(10) Patent No.: US 12,544,794 B2
(45) Date of Patent: Feb. 10, 2026

(54) STAGGERED AND INTER-IMPINGING SELF-CLEANING SCREENING DEVICE

(71) Applicant: ANYANG HENGWEI PETROCHEMICAL EQUIPMENT CO., LTD., Henan (CN)

(72) Inventors: Juncang Liu, Anyang (CN); Xueji Yang, Anyang (CN); Fenggang Guo, Anyang (CN)

(73) Assignee: ANYANG HENGWEI PETROCHEMICAL EQUIPMENT CO., LTD., Anyang (CN)

( * ) Notice: Subject to any disclaimer, the term of this patent is extended or adjusted under 35 U.S.C. 154(b) by 0 days.

(21) Appl. No.: 18/848,463

(22) PCT Filed: Jun. 13, 2023

(86) PCT No.: PCT/CN2023/099833

§ 371 (c)(1),
(2) Date: Sep. 18, 2024

(87) PCT Pub. No.: WO2024/045763

PCT Pub. Date: Mar. 7, 2024

(65) Prior Publication Data

US 2025/0205742 A1 Jun. 26, 2025

(30) Foreign Application Priority Data

Aug. 31, 2022 (CN) ........................ 202211050836.3

(51) Int. Cl.
*B07B 1/55* (2006.01)
*B07B 1/15* (2006.01)

(52) U.S. Cl.
CPC . *B07B 1/55* (2013.01); *B07B 1/15* (2013.01)

(58) Field of Classification Search
CPC .................................. B07B 1/14; B07B 1/15
(Continued)

(56) References Cited

U.S. PATENT DOCUMENTS

2004/0099582 A1* 5/2004 Largent .............. B01D 33/0376 209/667
2012/0312724 A1 12/2012 Farwick
2019/0217342 A1* 7/2019 Parr ........................ B07C 5/342

FOREIGN PATENT DOCUMENTS

CN 102950104 A 3/2013
CN 211051868 U 7/2020
(Continued)

OTHER PUBLICATIONS

Kronenberger; Ernst, "Disk for Screen or Separator" (English Translation), Sep. 2, 1998, worldwide.espacenet.com (Year: 1998).*
(Continued)

*Primary Examiner* — Molly K Devine
(74) *Attorney, Agent, or Firm* — Morgan, Lewis & Bockius LLP

(57) ABSTRACT

The present invention discloses a staggered and inter-impinging self-cleaning screening device, comprising a plurality of staggered and inter-impinging rotating screening mechanisms arranged in a tilted downward conveying direction, movement generating mechanisms, and pulse warning automatic cleaning mechanisms; the staggered and inter-impinging rotating screening mechanisms are adjacently arranged or arranged every other shaft; the self-cleaning screen devices are equidistantly coupled and installed on the outer surface of the rotating shaft; the rotating shaft is constructed into a hollow structure, and provided with spray-holes; the self-cleaning screen devices of the rotating shaft are equidistantly staggered with each other in the coaxial direction; the pulse warning automatic cleaning mechanism comprises an overload detector, and a controller; the overload detector is installed at one end of the rotating shaft; the movement generating mechanism includes planar cams installed at both ends of the rotating shaft assembly.

12 Claims, 5 Drawing Sheets

(58) Field of Classification Search
USPC ........................................ 209/358, 379, 380
See application file for complete search history.

(56) References Cited

FOREIGN PATENT DOCUMENTS

| | | | | | |
|---|---|---|---|---|---|
| CN | 111604264 | A | | 9/2020 | |
| CN | 215656236 | U | | 1/2022 | |
| CN | 113996521 | A | | 2/2022 | |
| CN | 218013921 | U | | 12/2022 | |
| DE | 19707845 | A1 | | 9/1998 | |
| EP | 0861696 | A1 | * | 9/1998 | ............... B07B 1/15 |

OTHER PUBLICATIONS

International Search Report and Written Opinion for International Patent Application No. PCT/CN2023/099233 dated Aug. 16, 2023, 11 pages.

* cited by examiner

STAGGERED AND INTER-IMPINGING SELF-CLEANING SCREENING DEVICE

CROSS-REFERENCE TO RELATED APPLICATIONS

This application is a 371 U.S. National Stage Entry of International Application No. PCT/CN2023/099833 filed Jun. 13, 2023, which claims priority to Chinese Patent Application No. 202211050836.3 filed Aug. 31, 2022, the entirety of each are incorporated herein by reference.

TECHNICAL FIELD

The present invention belongs to the field of material screening, in particular to a staggered and inter-impinging self-cleaning screening device.

BACKGROUND

Currently, in coking plants, power plants, coal mines and other industries, some materials need to be screened. However, these materials are wet and sticky, so traditional vibration screening has poor results. Generally, cross screening equipment is used, which generally consists of 14-27 shafts. Each shaft is provided with several equidistantly arranged screens. The screens of adjacent shafts are intersected, and the gap between the intersections is the sieve opening. A certain spacing is provided between the respective shafts. The central plane of each shaft has a certain angle to the ground, forming a tilted screen surface.

During the operation of the above cross screening equipment, since the materials are wet and sticky, small-particle materials will adhere to the screens. As the materials adhere to both sides of the screen, they will rub against the intersecting screens after reaching a certain thickness, thus forming a disc brake effect, which would result in an increase in the equipment load and stop of the motor due to current overload. The conventional solution to this problem is to arrange a toothed scraper 700 below each screen shaft, where the scraper extends between the screens with a certain gap with them, thus achieving the effect of scraping off adhesive materials with no friction, as shown in FIG. 1. The problem with this solution is that the materials scraped off by the toothed scraper cannot completely fall off, but will continuously accumulate within the angle range formed by the shaft, screen, and toothed scraper, leading to a significant increase in the friction force of the screen. The usual solution is to regularly clean the adhesive materials below the screen surface or equip a large surplus of motor power. The disadvantage of the previous approach lies in a poor working environment and high manual labor intensity, while the latter approach would lead to electric power waste.

CN204953339U discloses a self-cleaning sieve plate and material screening mechanism, which includes a material screening mechanism and a knocking mechanism. The material screening mechanism includes a screen with several sieve openings provided thereon, so that the materials are divided, through the sieve openings, into materials above the sieve and materials under the sieve, thus achieving material screening and classification. The knocking mechanism is fixed on the frame, so that the knocking mechanism knocks against the screen during the feeding process under the vibration of the material screening mechanism, allowing the materials to smoothly pass through the sieve openings of the screen. The technical problem to be solved is that when a bar-type sieve plate is used in the prior art, the bar is prone to wear and fracture, and as the reserved feeding gap between adjacent bars is too wide or too long, it is easy to cause technical defects such as large-particle material falling off during long-term use.

CN208466411U discloses a material screening and distribution device, which includes a housing and an impeller screening mechanism. The impeller screening mechanism is formed by a plurality of sets of horizontally arranged impeller screening rollers arranged in sequence. Each impeller screening roller includes an impeller shaft, several impellers and several impeller spacers, where the impeller shafts of the respective impeller screening rollers are parallel to each other, and the impeller and impeller spacers are sequentially spaced and sleeved on the impeller shaft, wherein the projections of the impellers on adjacent impeller screening rollers have overlapping portions in the axial direction. At least one self-cleaning plate is distributed on each impeller, with the root of the self-cleaning plate fixed at the edge of the impeller and the end thereof extending near the impeller spacer of the adjacent impeller screening roller. The technical problem to be solved is that as the materials enter the screening and distribution device and adheres to the impeller spacers, rotating impellers and self-cleaning plates are inserted between the two adjacent impellers in the adjacent, which can scrape the materials off the impeller spacers, thus effectively avoiding the problems of sieve pore blockage, reduced screening efficiency, increased component wear, and reduced service life caused by material adhesion. At the same time, due to the difference in rotation speed between the adjacent impeller screening rollers, the positions that the impeller drives the self-cleaning plate to clean will be different every time the impeller rotates. Therefore, through multiple rotations, the various angles of the impeller spacer will be swept by the self-cleaning plate, thus achieving no dead angle cleaning of adhesive materials.

In summary, the above technical solutions fail to solve the problem of the "disc brake effect" caused by the adhesion of materials to the screen during the operation of the screening equipment. At the same time, there is no warning and monitoring for the potential trend of the "disc brake effect".

SUMMARY

The present invention aims to provide a staggered and inter-impinging self-cleaning screening device, so to solve the technical problem of "disc brake effect" caused by material adhered to the screen.

In order to achieve the above objectives, the specific technical solution of a staggered and inter-impinging self-cleaning screening device of the present invention is as follows: a staggered and inter-impinging self-cleaning screening device comprises a plurality of staggered and inter-impinging rotating screening mechanisms arranged in a tilted downward conveying direction, movement generating mechanisms, pulse warning automatic cleaning mechanisms, wherein, the staggered and inter-impinging rotating screening mechanisms are adjacently arranged or arranged every other shaft, the staggered and inter-impinging rotating screening mechanism includes one, two or more sets of adjacent rotating shaft assemblies arranged in a staggered manner; the rotating shaft assembly comprises a rotating shaft and self-cleaning screen devices equidistantly coupled and installed on the outer surface of the rotating shaft; the rotating shaft is constructed into a hollow structure, and radial spray-holes are arranged in the axial direction of the rotating shaft, where the spray-holes are close to both sides of the self-cleaning screen device; the self-cleaning screen device comprises rotating shaft screens and cleaning teeth sets; the rotating shaft screens are constructed into a circular disc shape and installed equidistantly on the rotating shaft; the cleaning teeth sets are symmetrically distributed on both sides of the rotating shaft screens, where the coaxial cleaning teeth sets are arranged in phase.

Further, the center distance L between adjacent rotating shafts meets the following conditions:

$$R+d_1<L<2R-\theta$$

R: radius of screen $d_1$: outer diameter of rotating shaft

θ: safety margin, which is generally taken as 2-15 mm, and the larger value is taken when the rotate speed is high.

Further, the rotating shaft assemblies are configured to rotate synchronously and in the same direction; the phase difference between the cleaning teeth of adjacent rotating shafts is 0–360/(2*n), where n is the evenly distributed number of cleaning teeth per circle.

Further, the self-cleaning screen devices of the rotating shaft are equidistant in the coaxial direction; the cleaning teeth sets of the coaxial adjacent self-cleaning screen devices are staggered with each other.

Further, the cleaning teeth sets can be uniformly arranged on both sides of the rotating shaft screen in single, double, or multiple circles.

Further, the cleaning tooth is of a rod shape, a prism shape, or a frustum shape.

Further, the pulse warning automatic cleaning mechanism includes an overload detector, a controller including an overload detector, a controller, and a pulse high-pressure gas/liquid impact section.

Further, the overload detector is installed every other shaft at one end of the rotating shaft.

Further, the movement generating mechanism is installed at both ends of the rotating shaft assembly, and the axial displacement distance H of the rotating shaft is less than 2 Δ, where Δ is the minimum average clearance on one side of the screen; the movement generating mechanisms are installed every other shaft.

Further, the movement generating mechanism is coaxial opposed planar cams.

The staggered and inter-impinging self-cleaning screening device of the present invention has the following advantages: 1. The staggered and inter-impinging self-cleaning screening device improves the screening effect of materials. The staggered and inter-impinging cleaning teeth are used to replace the toothed scraper structure, performing self-cleaning during the rotating screening process. The device structure is simpler and cleaning is more convenient. 2. The staggered and inter-impinging self-cleaning screening device adopts a pulse warning automatic cleaning mechanism. By configuring an overload detector, the load of the rotating shaft for the material screening is monitored and warned in real time. If it exceeds the specified value, pulse signals are transmitted in a timely manner, and a controller is used for control. High pressure water or high pressure gas is introduced into the hollow rotating shaft to timely clean the screening device, and the overload operation of the motor is timely reduced, thus solving the problem of "disc brake effect" during the screening process of materials, and significantly reducing the power of the configured motor and saving electricity. 3. The movement generating mechanism arranged every other shaft of the staggered and inter-impinging self-cleaning screening device utilizes the axial movement effect created by the planar cams to vibrate the materials in the screening process, thus further facilitating the screening effect of the materials, and slowing down the occurrence rate of the "disc brake effect" during the screening process. 4. The staggered and inter-impinging self-cleaning screening device saves manual cleaning, is easy to repair and maintain, and has high reliability.

Figure 1:
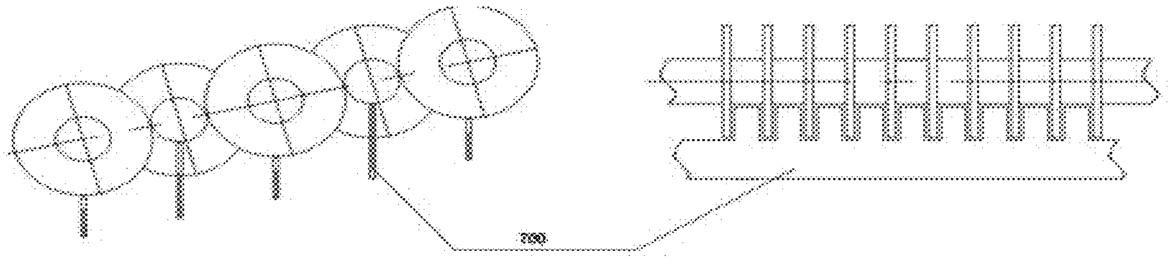
FIG. 1 is a schematic diagram of the original structure of a cross screening device.
Figure 2:
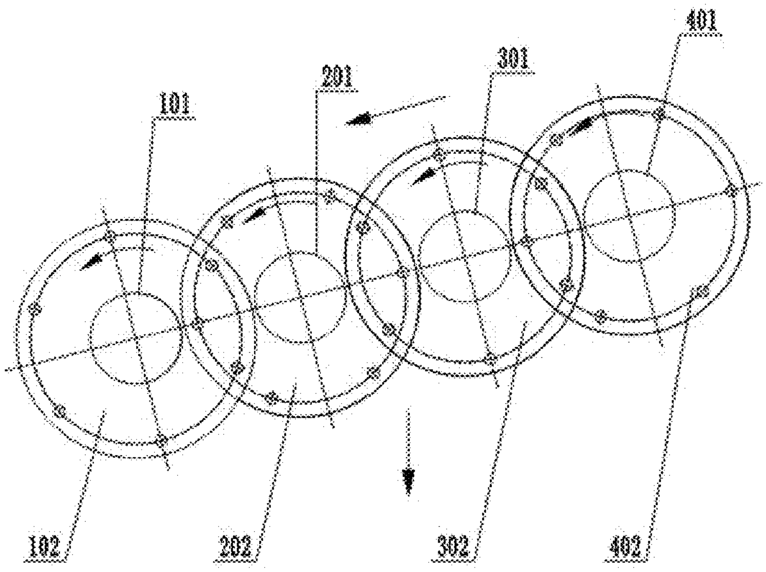
FIG. 2 is a front view I of the staggered and inter-impinging self-cleaning screening device.
Figure 3:
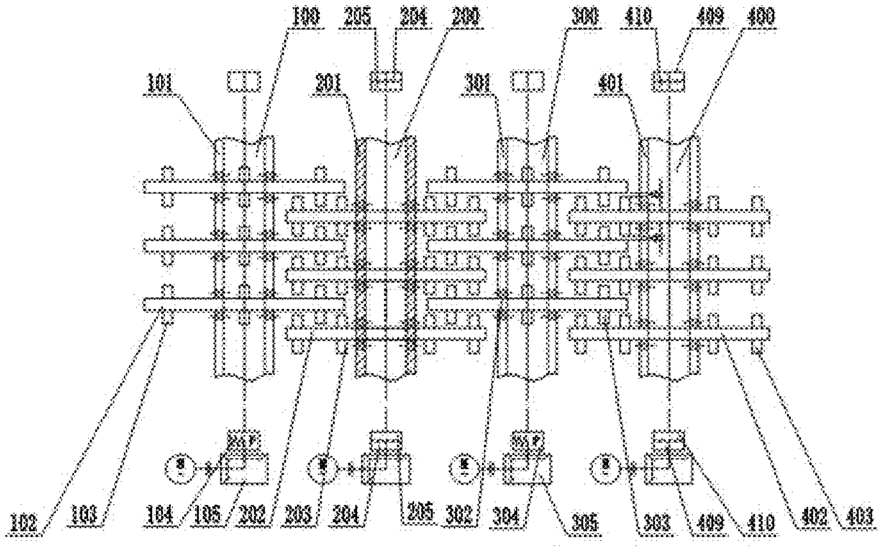
FIG. 3 is a top view (rotating) I of the staggered and inter-impinging self-cleaning screening device.
Figure 4:
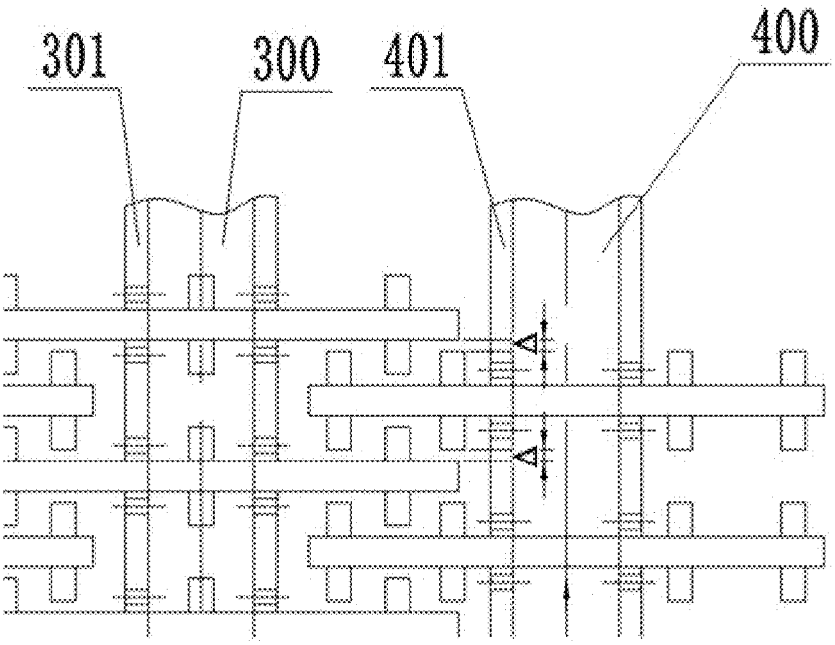
FIG. 4 is an axial partially enlarged view of the staggered and inter-impinging self-cleaning screening device.
Figure 5:
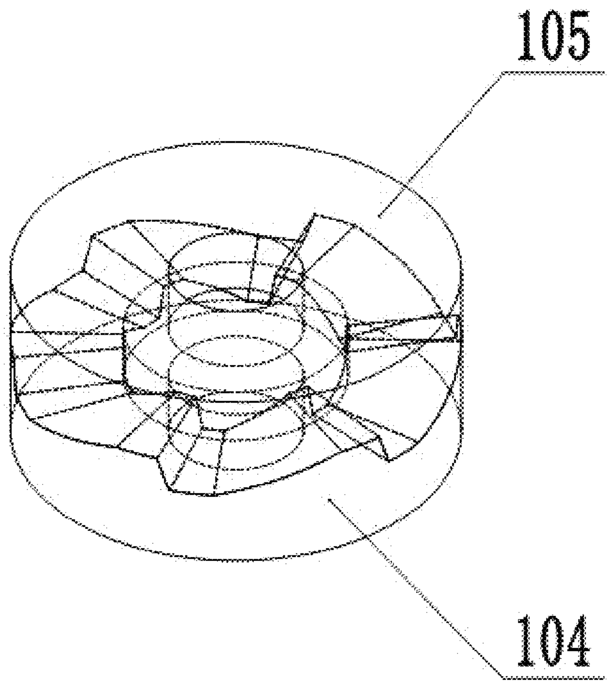
FIG. 5 is a schematic diagram of the planar cam mechanism of the staggered and inter-impinging self-cleaning screening device.

Numeration in the figures: 100—Rotating shaft I assembly, 101—Rotating shaft I, 102—Rotating shaft I screen, 103—Cleaning teeth set I, 104—Overload detector I, 105—Controller I, 106—Spray-hole I, 200—Rotating shaft II assembly, 201—Rotating shaft II, 202—Rotating shaft II screen, 203—Cleaning teeth set II, 204—Fixed planar cam I, 205—Movable planar cam I, 206—Spray-hole II, 300—Rotating shaft III assembly, 301—Rotating shaft III, 302—Rotating shaft III screen, 303—Cleaning teeth set III, 304—Overload detector II, 305—Controller II, 400—Rotating shaft IV assembly, 401—Rotating shaft IV, 402—Rotating shaft IV screen, 403—Rotating shaft IV cleaning tooth a, 404—Rotating shaft IV cleaning tooth b, 405—Rotating shaft IV cleaning tooth c, 406—Rotating shaft IV cleaning tooth d, 407—Rotating shaft IV cleaning tooth e, 408—Rotating shaft IV cleaning tooth f, 409—Fixed planar cam II, 410—Movable planar cam II, 500—Cleaning teeth trajectory, 600—Cleaning teeth trajectory line, 700—Scraper.

DETAILED DESCRIPTION

In order to better understand the objective, structure, and function of the present invention, a staggered and inter-impinging self-cleaning screening device of the present invention is further elaborated below in conjunction with the accompanying drawings. Obviously, the described embodiments are only a part of the embodiments of the present invention, not all of them. Based on the embodiments in this invention, all other embodiments obtained by those skilled in the art belong to the scope of protection of the present invention.

Embodiment 1

As shown in FIGS. 2, 3, 4, and 5, the staggered and inter-impinging self-cleaning screening device of the present invention comprises a staggered and inter-impinging rotating screening mechanism I, a staggered and inter-impinging rotating screening mechanism II, a movement generating mechanism I, a pulse warning automatic cleaning mechanism I, a movement generating mechanism II, and a pulse warning automatic cleaning mechanism II, arranged in a tilted downward conveying direction. The staggered and inter-impinging rotating screening mechanism I comprises a rotating shaft I assembly 100 and a rotating shaft II assembly 200, and the staggered and inter-impinging rotating screening mechanism II comprises a rotating shaft III assembly 300 and a rotating shaft IV assembly 400.

Further, the rotating shaft I assembly 100 comprises a rotating shaft I 101 and self-cleaning screen devices I. The rotating shaft I 101 is constructed into a hollow structure, where spray-holes I 106 are arranged radially on the rotating shaft I 101. The self-cleaning screen devices I are coupled and installed equidistantly on the outer surface of the rotating shaft I 101, where the number of the self-cleaning screen devices I is greater than 2.

Further, the spray-holes I 106 are symmetrically arranged on two sides of the self-cleaning screen device I, and are close to the two sides of the self-cleaning screen device I. High-pressure water or high-pressure gas is injected into the hollow rotating shaft I 101, and is then sprayed out through the spray-holes I 106 to clean the materials adhering to the self-cleaning screening device I or the rotating shaft I 101.

Further, the self-cleaning screen device I comprises a rotating shaft I screen 102 and a cleaning teeth set I 103. The rotating shaft I screen 102 is constructed into a circular disc shape, and is coupled in a staggered manner and installed on the outer surface of the rotating shaft I 101. The cleaning teeth sets I 103 are uniformly in a single row distributed and symmetrically coupled on the ends of the same diameter on both sides of the rotating shaft I screen 102. The cleaning teeth sets I 103 have the same structure and the same protrusion height on both sides of the screen. The number of the cleaning teeth set I 103 is greater than 1, and when the material is of high stickiness, is difficulty to be peeled, and has strong adhesion, a smaller number of teeth are to be employed, the radial size of the cleaning teeth is to be increased, the strength of the cleaning teeth is to be enhanced, and the reliability of the self-cleaning screen is to be improved. The relative angle between the self-cleaning screen device I and the rotating shaft I 101 is consistent.

Further, the rotating shaft II assembly 200 comprises a rotating shaft II 201, a self-cleaning screen device II. The rotating shaft II 201 is constructed into a hollow structure, and spray-holes II 206 are arranged radially on the rotating shaft II 201. The self-cleaning screen devices II are coupled and installed equidistantly on the outer surface of the rotating shaft II 201, where the number of the self-cleaning screen devices II is greater than 2.

Further, the spray-holes II 206 are symmetrically arranged on two sides of the self-cleaning screen device II and are close to the two sides of the self-cleaning screen device II. High-pressure water or high-pressure gas is injected into the hollow rotating shaft II 201, and is then sprayed out through the spray-holes II 206 to clean the materials adhering to the self-cleaning screen device II or the rotating shaft II 201.

Further, the self-cleaning screen device II comprises a rotating shaft II screen 202 and a cleaning teeth set II 203. The rotating shaft II screen 202 is constructed into a circular disc shape, and is coupled and installed on the outer surface of the rotating shaft II 201. The cleaning teeth sets II 203 are coupled in a double row and symmetrically arranged on the ends of the same diameter on both sides of the rotating shaft II screen 202. The cleaning teeth sets II 203 have the same structure and the same protrusion height on both sides of the screen, and the number of the cleaning teeth is greater than 1. The relative angle between the self-cleaning screen device II and the rotating shaft II 201 is consistent.

Further, the center distance L between adjacent rotating shaft I 101 and rotating shaft II 201 meets the following conditions:

$$R + d_1 < L < 2R - \theta$$

R: radius of screen $d_1$: outer diameter of rotating shaft

θ: safety margin, which is generally taken as 2-15 mm, and the larger value is taken when the rotate speed is high.

Further, the rotating shaft I assembly 100 and the rotating shaft II assembly 200 rotate synchronously in the same direction. The start angles of the rotating shaft I assembly 100 and the rotating shaft II assembly 200 can be the same or different, and the phase difference between the cleaning teeth is 0–360/(2*n), where n is the evenly distributed number of cleaning teeth per circle, so as to avoid interference during operation. The cleaning teeth can also be distributed in different positions radially, so as to ensure that the cleaning teeth do not interfere each other during rotation.

Further, the self-cleaning screen device I on the rotating shaft I 101 and the self-cleaning screen device II on the rotating shaft II 201 intersect equidistantly in the coaxial direction. The single-row cleaning teeth of the cleaning teeth set I 103 are located between the circumferences of the double-row cleaning teeth of the cleaning teeth set II 203, which are staggered with each other. During the rotation process, the rotating shaft I 101 and the rotating shaft II 201 drive the self-cleaning screen device I and the self-cleaning screen device II to rotate. By forming a staggered and inter-impinging mutual cleaning function by the single-row cleaning teeth of the cleaning teeth set I 103 and the double-row cleaning teeth of the cleaning teeth set II 203 during the rotation process, the self-cleaning process can be completed within the staggered range of the screens.

Further, the cleaning teeth set I 103 and the cleaning teeth set II 203 can be arranged uniformly on the circumferences on the two sides of the rotating shaft I screen 102 and the rotating shaft II screen 202 by single, double, or multiple circles, thus further improving the cleaning ability.

Further, the cleaning teeth are of a rod shape, a prism shape, or a frustum shape.

Similarly, the structures of the rotating shaft III assembly 300 and the rotating shaft IV assembly 400 are similar, and thus will not be described further here.

The pulse warning automatic cleaning mechanism I comprises an overload detector I 104 and a controller I 105. The overload detector I 104 is installed at the lower end of the rotating shaft I 101, where the load change of the rotating shaft I 101 is monitored in real-time through the overload detector 104. The effective range of overload detection is set to 0-2.5 times the rated load. When the rotating load torque exceeds the specified value of 1.2-1.5 times that of the motor, abnormal pulse signals will be transmitted to the controller I 105, which opens the high-pressure gas or liquid impact section. The externally connected high-pressure gas or high-pressure water enters the hollow rotating shaft, and is then sprayed out through the radial spray-holes I 106 of the rotating shaft I 101 under high pressure. The materials adhering to the rotating shaft I 101 and the rotating shaft I screen 102 are impulsively impinged and cleaned.

Further, the overload detector 104 is installed every other shaft to achieve real-time monitoring and warning of the rotating torque load for each set of staggered and inter-impinging rotating mechanisms.

The movement generating mechanism I is installed at both ends of the rotating shaft II assembly 200, and the axial displacement distance H of the rotating shaft II 201 is less than 2 Δ, where Δ is the minimum average clearance on one side of the screen. The rotating shaft II 201 undergoes axial movement through the movement generating mechanism, driving the cleaning teeth set II 203 on the rotating shaft II screen 202 coupled to be installed on the outer diameter of the rotating shaft II 201 to move between two adjacent sets of screens of the rotating shaft I assembly 100, causing vibration to the falling materials. At the same time, the staggered and inter-impinging cleaning teeth sets clean the materials for each other.

Further, the movement generating mechanism I is configured to be installed every other shaft, so as to achieve regular vibration and loosening during the material screening process, thus making the materials fall more smoothly.

Further, the movement generating mechanism I is configured as coaxial opposed planar cams, which comprise a fixed planar cam I 204 and a movable planar cam I 205. The relative displacement between the movable planar cam I 205 and the fixed planar cam I 204 drives the rotating shaft II 201 to move axially. As the materials are squeezed in the screening mechanism, the movable planar cam I 205 and the fixed planar cam I 204 are driven to be always fitted with each other in the axial plane, thus achieving dynamic movement of the rotating axis II 201.

Similarly, the structures of the movement generating mechanism II and the pulse warning automatic cleaning mechanism II are similar, and thus will not be described further here.

Figure 6:
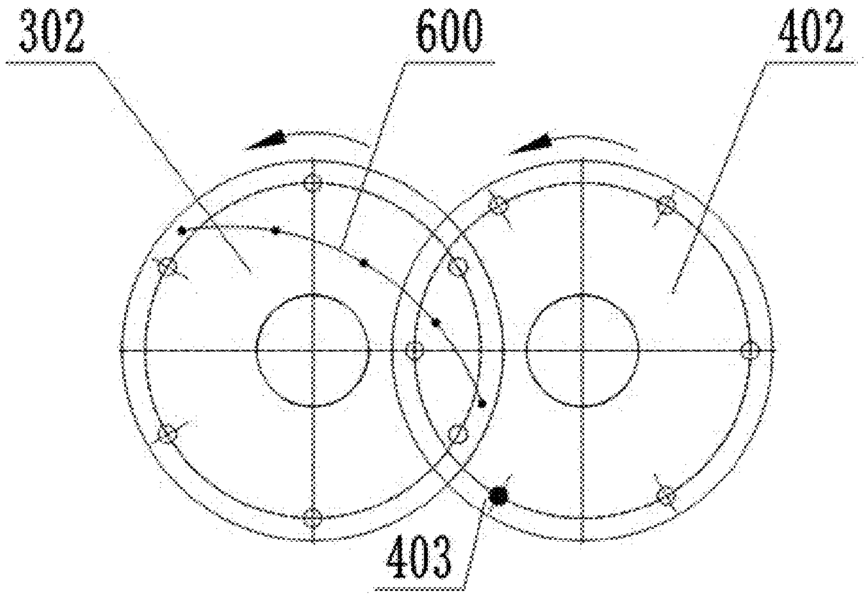
FIG. 6 is a partial view of the staggered and inter-impinging self-cleaning screening device.
Figure 7:
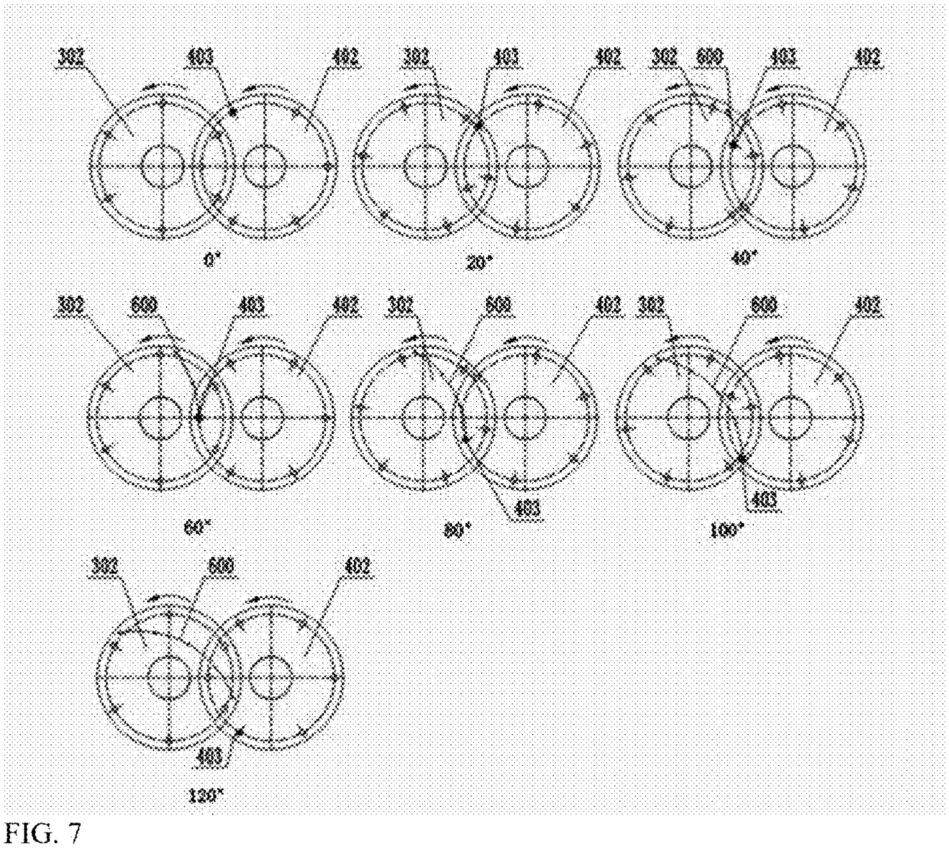
FIG. 7 is a diagram of the formation of the cleaning trajectory of the staggered and inter-impinging self-cleaning screening device.
Figure 8:
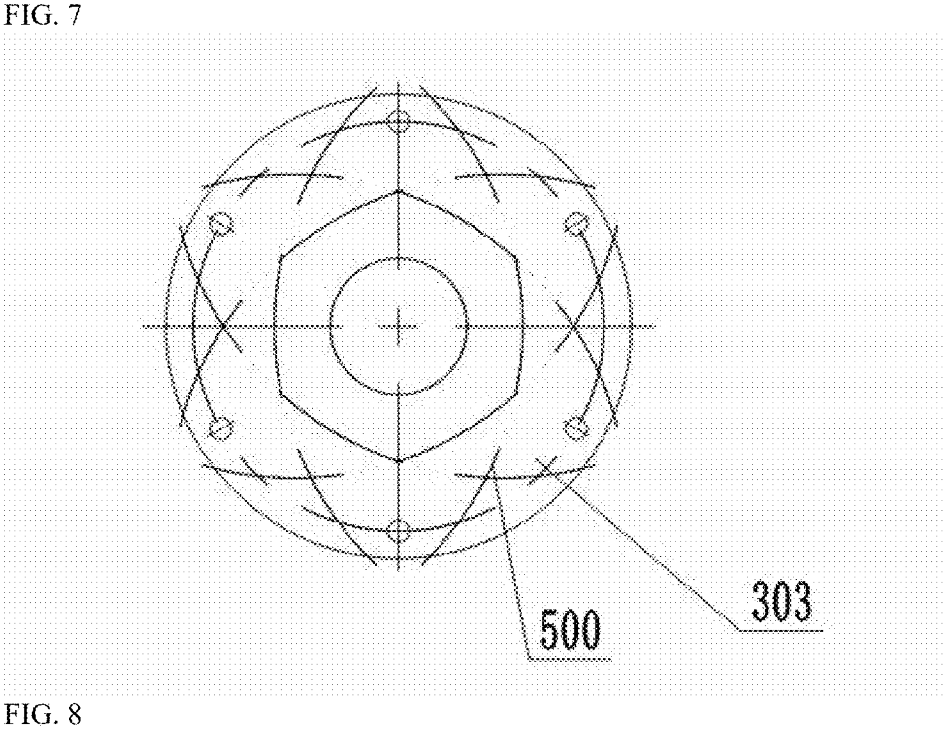
FIG. 8 is a complete trajectory diagram of the staggered and inter-impinging self-cleaning screening device.

In conjunction with FIGS. 6, 7, and 8, the self-cleaning principle of a staggered and inter-impinging self-cleaning screening device of the present invention is described in detail.

As shown in FIG. 6, within the staggered range of the rotating shaft III screen 302 and the rotating shaft IV screen 402, the rotating shaft III screen 302 rotates counterclockwise upwards and the rotating shaft IV screen 402 rotates clockwise downwards. The two sets of screens form opposite movements.

Further, as shown in FIGS. 7 and 8, starting from the intersecting contact between the rotating shaft III cleaning tooth a 403 and the rotating shaft III screen 302, the rotating shaft III cleaning tooth a 403 begins to clean the adhesive materials on one side of the rotating shaft III screen 302. Further, the rotating shaft III cleaning tooth a 403 continuously move downwards around the center of the circle, and the cleaned positions move upwards with the rotating shaft III screen 302. These two relative movements between the rotating shaft III cleaning tooth a 403 and the cleaned positions finally form a circular arc-shaped cleaning trajectory 500. The cleaning process is a mutual cleaning process, where each cleaning tooth can form a circular arc-shaped trajectory 500 on the side of the screens on the two sides of the intersecting cleaning tooth. There are as many cleaning trajectory lines 600 as there are cleaning teeth, thus achieving a dynamic self-cleaning effect without the need for other mechanisms.

Further, for the adjacent staggered and inter-impinging rotating mechanisms I and II, namely the rotating shaft I assembly 100, the rotating shaft II assembly 200, the rotating shaft III assembly 300, and the rotating shaft IV assembly 400, the respective adjacent rotating shaft assemblies clean each other. The cleaning teeth can simultaneously clean two adjacent intersecting screens on the two sides of the cleaning teeth. The cleaning trajectories cover a wide range, starting from the edge of the screen, extending to the vicinity of the rotating shaft diameter, and continuously extending to the edge of the screen, thus achieving the complete cleaning from the edge to the vicinity of the shaft diameter. The self-cleaning of the screen is a dynamic cleaning process, where the materials are continuously cleaned during the movement of adjacent rotating shaft assemblies, so adhesive materials cannot accumulate.

The Use Process or Working State of the Present Invention:

An external motor drives the rotating mechanism to rotate counterclockwise through a reduction gear, where the materials flow in an inclined downward direction for screening. When the materials flow, move and overturn for screening, the materials enter between the two adjacent sets of staggered screens of the adjacent rotating shaft I assembly 100, the rotating shaft II assembly 200, the rotating shaft III assembly 300, and the rotating shaft IV assembly 400. Through the staggered and inter-impinging self-cleaning of the cleaning teeth sets coupled to be fixed on both sides of the screens and multiple vibrations, qualified materials fall from the screening device, while materials that cannot be screened slide obliquely along the screening device, thus achieving screening of the materials.

Further, the movement generating mechanisms are installed at the lower ends of the rotating shaft assembly II and the rotating shaft assembly IV 400. The movable planar cam I 205 on the rotating shaft II 201 and the movable planar cam II 410 on the rotating shaft IV 401 form a movement effect in the axial direction relative to the fixed planar cam I 204 and the fixed planar cam II 409 during rotation, and further drive the cleaning teeth of the screens that are coupled to be installed on the outer diameters of the rotating shaft II 201 and the rotating shaft IV 401 to move between the two adjacent sets of screen cleaning teeth of the rotating shaft assembly I 200 and the rotating shaft assembly III 400, further exerting a vibration effect on the falling materials. At the same time, the staggered and inter-impinging cleaning teeth sets clean the materials closely between each other, avoiding the generation of disc brake effect during the material screening process.

If, during the screening process of the materials, the materials adhere to the screens and cleaning teeth, forming a disc brake effect, and the rotating shaft is overloaded, overload detector I 104 and overload detector III 304 configured to be installed every other shaft on one side of the rotating shaft perform monitoring and warning in real-time. When the detected value exceeds 1.2 to 1.5 times the value of the rated load, pulse signals are generated and transmitted to controller I. Controller I 105 and controller II 305 turn on the control switches for high-pressure water or high-pressure gas, and the external high-pressure gas or high-pressure water enters the hollow rotating shaft I 101, rotating shaft II 201, rotating shaft III 301, and rotating shaft IV 401. The materials adhered to the rotating shafts and screens are cleaned by spraying at high pressure the high-pressure gas or high-pressure water through the radial spray-holes of the rotating shaft I 101, rotating shaft II 201, rotating shaft III 301, and rotating shaft IV 401. Under the combined action of the staggered and inter-impinging self-cleaning of the cleaning teeth sets, the axial movement and vibration of the rotating shaft, and the impulsive automatic cleaning, the disc brake effect of material screening is eliminated.

In the same device, the structure, size, and direction of rotation of the rotating shaft assemblies are similar or the same. In this embodiment, only two sets of adjacent staggered and inter-impinging rotating mechanisms are selected for explanation. The self-cleaning screen device on each rotating shaft assembly is provided with cleaning teeth. However, it is not limited to two sets of staggered and inter-impinging rotating mechanisms. There may be a plurality of sets of adjacent staggered and inter-impinging rotating mechanisms.

Embodiment 2

Figure 9:
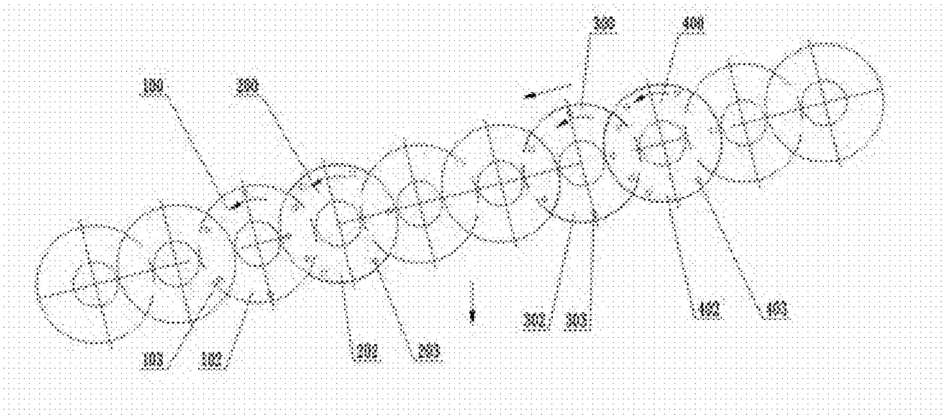
FIG. 9 is a front view II of the staggered and inter-impinging self-cleaning screening device.
Figure 10:
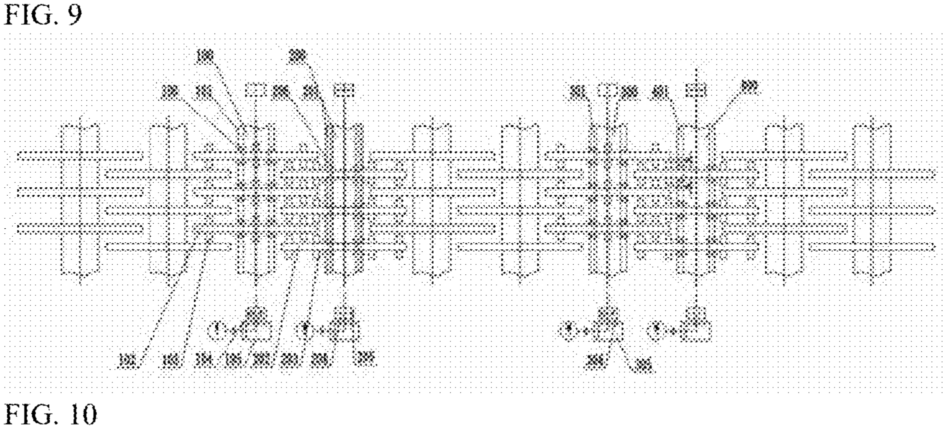
FIG. 10 is a top view (rotating) II of the staggered and inter-impinging self-cleaning screening device.

As shown in FIGS. 9 and 10, a staggered and inter-impinging self-cleaning screening device comprises an ordinary screening rotating structure and a staggered and inter-impinging rotating mechanism. Two ordinary rotating shafts without cleaning teeth are installed on both sides of the two rotating shafts of the staggered and inter-impinging rotating mechanism. The screen of the rotating shaft assembly of the ordinary screening rotating mechanism does not have staggered and inter-impinging cleaning teeth and has no self-cleaning function.

The two sets of rotating mechanisms, namely the staggered and inter-impinging rotating mechanism I and the staggered and inter-impinging rotating screening mechanism II, are arranged every other shaft. Similarly, the staggered and inter-impinging rotating mechanism I comprises a rotating shaft I assembly 100 and a rotating shaft II assembly 200, while the staggered and inter-impinging rotating screening mechanism II comprises a rotating shaft III assembly 300 and a rotating shaft IV assembly 400.

Further, the rotation of the rotating shaft I screen 102 drives the cleaning teeth set I 103 to rotate for inter-impinging self-cleaning of the adjacent rotating shaft II screen 202 on the right side. At the same time, the cleaning teeth set I 103 of the rotating shaft I screen 102 cleans the adjacent ordinary screen on the left side. Similarly, the cleaning teeth II 203 of the rotating shaft II screen 202 clean the adjacent ordinary screen on the right side. Similarly, the cleaning teeth set of the rotating shaft III screen 302 and the cleaning teeth set of the rotating shaft IV screen 402, while performing inter-impinging self-cleaning for each other, also clean the adjacent ordinary screens on both sides.

The above embodiments are the preferred implementation schemes of the present invention. In addition, the present invention can be implemented in other ways, and various changes and modifications can be made without departing from the scope and spirit of the patent application. Any simple modifications, and equivalent changes and modifications made to the above embodiments based on the technical essence of the present invention fall within the scope of the technical solution of the present invention.

In order to facilitate those skilled in the art to understand the improvements of the present invention compared to the prior art, some of the accompanying drawings and descriptions of the present invention have been simplified. And, for the sake of clarity, some other elements have been omitted from the present application document. Those skilled in the art should note that these omitted elements also constitute the content of the present invention.

What is claimed is:

1. A staggered and inter-impinging self-cleaning screening device, comprising a plurality of staggered and inter-impinging rotating screening mechanisms arranged in a tilted downward conveying direction, movement generating mechanisms, and pulse warning automatic cleaning mechanisms, wherein:

- the staggered and inter-impinging rotating screening mechanisms are adjacently arranged or arranged every other shaft, the staggered inter-impinging rotating screening mechanism includes one, two or more sets of adjacent rotating shaft assemblies arranged in a staggered manner;
- the rotating shaft assembly comprises a rotating shaft and self-cleaning screen devices equidistantly coupled and installed on the outer surface of the rotating shaft;
- the rotating shaft is constructed into a hollow structure, and radial spray-holes are arranged in the axial direction of the rotating shaft, where the outlets of the spray-holes are close adjacent to both sides of the self-cleaning screen device so as to spray the self-cleaning screen device;
- the self-cleaning screen device comprises rotating shaft screens and cleaning teeth sets;
- the rotating shaft screens are constructed into a circular disc shape and installed equidistantly on the rotating shaft;
- the cleaning teeth sets are symmetrically distributed on both sides of the rotating shaft screens, where the coaxial cleaning teeth sets are arranged in phase,
- wherein the movement generating mechanisms are installed at both ends of the rotating shaft assembly and configured to move the rotating shaft axially.

2. The staggered and inter-impinging self-cleaning screening device according to claim 1, wherein the center distance L between adjacent rotating shafts meets the following conditions:

$$R+d_1<L<2R-\theta$$

R: radius of screen $d_1$: outer diameter of rotating shaft

θ: safety margin, which is a constant and taken as 2-15 mm.

3. The staggered and inter-impinging self-cleaning screening device according to claim 1, wherein the rotating shaft assembly is configured to rotate synchronously and in the same direction; the phase difference between cleaning teeth of adjacent rotating shafts is 0-360/(2*n), where n is the evenly distributed number of cleaning teeth per circle.

4. The staggered and inter-impinging self-cleaning screening device according to claim 3, wherein the cleaning tooth is of a rod shape, a prism shape, or a frustum shape.

5. The staggered and inter-impinging self-cleaning screening device according to claim 1, wherein self-cleaning screen devices of the rotating shaft are equidistant in the coaxial direction; the cleaning teeth sets of the coaxial adjacent self-cleaning screen devices are staggered with each other.

6. The staggered and inter-impinging self-cleaning screening device according to claim 1, wherein the cleaning teeth sets are capable of being uniformly arranged on both sides of the rotating shaft screen in single, double, or multiple circles.

7. The staggered and inter-impinging self-cleaning screening device according to claim 6, wherein the cleaning tooth is of a rod shape, a prism shape, or a frustum shape.

8. The staggered and inter-impinging self-cleaning screening device according to claim 1, wherein the cleaning tooth is of a rod shape, a prism shape, or a frustum shape.

9. The staggered and inter-impinging self-cleaning screening device according to claim 1, wherein the pulse warning automatic cleaning mechanism comprises an overload detector, a controller, and a pulse high-pressure gas/liquid impact section.

10. The staggered and inter-impinging self-cleaning screening device according to claim 9, wherein the overload detector is installed every other shaft at one end of the rotating shaft.

11. The staggered and inter-impinging self-cleaning screening device according to claim 1, wherein an axial displacement distance H of the rotating shaft is less than 2 Δ, where Δ is the minimum average clearance, measured along the axial direction of the rotating shaft, between two immediately adjacent rotating shaft screens on one side; the movement generating mechanisms are installed every other shaft.

12. The staggered and inter-impinging self-cleaning screening device according to claim 1, wherein the movement generating mechanisms are coaxial opposed planar cams.

* * * * *